(12) United States Patent
Chang et al.

(10) Patent No.: US 6,841,081 B2
(45) Date of Patent: Jan. 11, 2005

(54) METHOD FOR MANUFACTURING REFLECTIVE SPATIAL LIGHT MODULATOR MIRROR DEVICES

(75) Inventors: Yuh-Hwa Chang, Taipei (TW); Jiann-Tyng Tzeng, Yi Lan (TW)

(73) Assignee: Taiwan Semiconductor Manufacturing Co. LTD, Hsinchu (TW)

( * ) Notice: Subject to any disclaimer, the term of this patent is extended or adjusted under 35 U.S.C. 154(b) by 35 days.

(21) Appl. No.: 10/611,041

(22) Filed: Jun. 30, 2003

(65) Prior Publication Data

US 2004/0245215 A1 Dec. 9, 2004

(30) Foreign Application Priority Data

Jun. 9, 2003 (TW) .......................................... 92115588 A (51) Int. Cl.⁷ .......................... B29D 11/00; H01L 21/00
(52) U.S. Cl. .......................................... 216/24; 438/29
(58) Field of Search ................................ 216/23, 24, 2; 438/29; 359/572, 573, 574, 575, 576, 237, 238, 295, 328, 846, 850, 267, 225, 290, 291, 223, 224; 385/18

(56) References Cited

U.S. PATENT DOCUMENTS

| | | | | |
|---|---|---|---|---|
| 4,566,935 A | * | 1/1986 | Hornbeck | 438/29 |
| 4,662,746 A | * | 5/1987 | Hornbeck | 359/223 |
| 5,061,049 A | * | 10/1991 | Hornbeck | 359/224 |
| 5,083,857 A | * | 1/1992 | Hornbeck | 359/291 |
| 5,485,304 A | * | 1/1996 | Kaeriyama | 359/291 |
| 5,583,688 A | * | 12/1996 | Hornbeck | 359/291 |
| 5,646,768 A | * | 7/1997 | Kaeriyama | 359/224 |
| 2003/0047533 A1 | * | 3/2003 | Reid et al. | 216/24 |
| 2003/0054588 A1 | * | 3/2003 | Patel et al. | 438/107 |

\* cited by examiner

Primary Examiner—Gregory Mills
Assistant Examiner—Roberts Culbert
(74) Attorney, Agent, or Firm—Glenn Patent Group; Michael A. Glenn (57) ABSTRACT

A method for manufacturing reflective spatial light modulator mirror devices is disclosed. In the method, a portion of a mirror layer and a first sacrificial layer beneath the portion of the mirror layer are removed simultaneously to expose the substrate while defining a pattern of the mirror layer. Then, a second sacrificial layer is deposited conformally, and substrate contact openings and a mirror layer contact opening are defined in the second sacrificial layer at the same time. Subsequently, a support material layer is deposited conformally and etched back, so as to form supporting posts of the mirror layer in the substrate contact openings. Before the support material layer is etched back, the substrate contact openings can be filled with a photoresist material first, so as to maintain the support material layer in the substrate contact openings and increase the structural intensity of the supporting posts.

28 Claims, 6 Drawing Sheets

METHOD FOR MANUFACTURING REFLECTIVE SPATIAL LIGHT MODULATOR MIRROR DEVICES

FIELD OF THE INVENTION

The present invention relates to a method for manufacturing reflective spatial light modulator mirror devices, and more particularly, to a manufacturing method of reflective spatial light modulator mirror devices that can avoid sacrificial layers peeling off and can simplify the process.

BACKGROUND OF THE INVENTION

Figure 1:
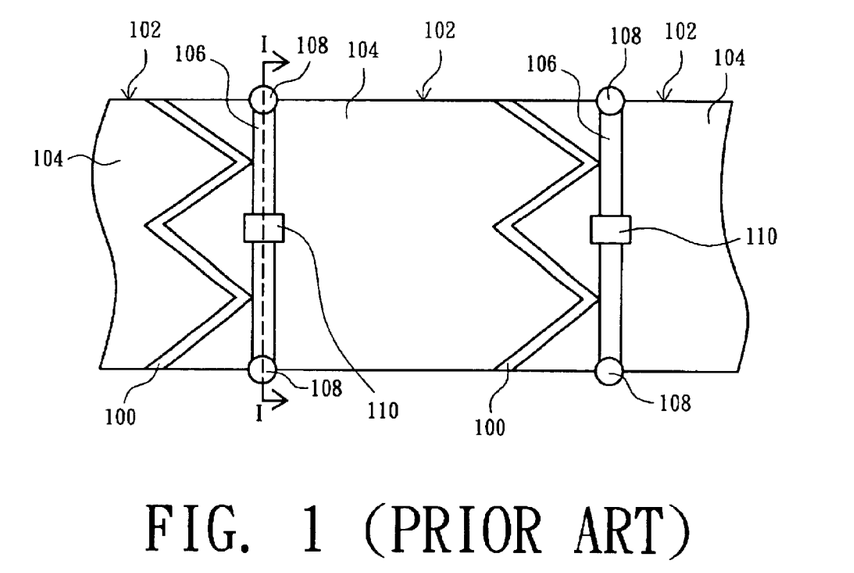
FIG. 1 illustrates a top view of typical reflective spatial light modulator mirror devices.

Referring to FIG. 1, FIG. 1 illustrates a top view of typical reflective spatial light modulator mirror devices. A mirror device 102 of a typical reflective spatial light modulator is formed above a substrate 100, and a mirror layer 104 of the mirror device 102 is supported by a hinge layer 106 and is separated from the substrate 100 with a distance, wherein the hinge layer 106 is supported by supporting posts 108. Furthermore, on the hinge layer 106, a contact opening 110 is formed, and the contact opening 10 is filled with the hinge layer 106 made of a conductive material, so that the hinge layer 106 is directly connected to the mirror layer 104. Because the material of the mirror layer 104 is a conductive material, the hinge layer 106 is electrically connected to the mirror layer 104.

Figure 2:
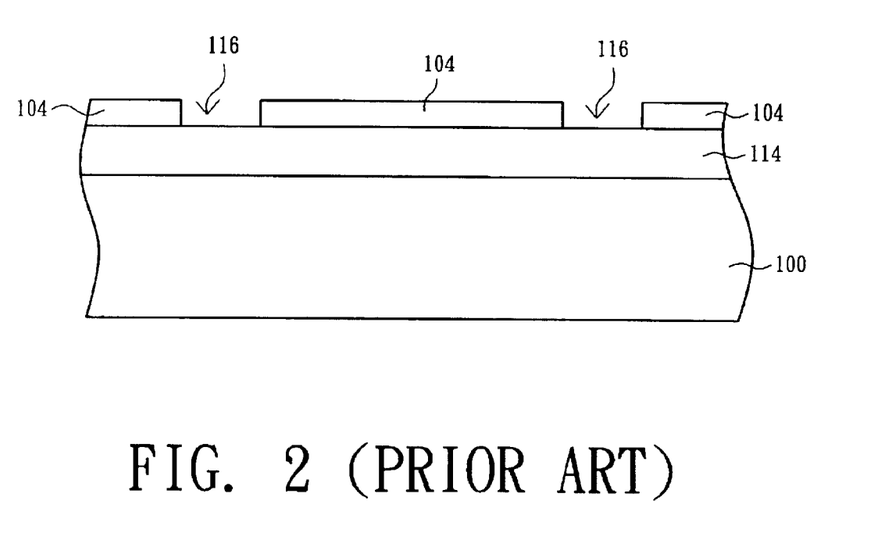
FIG. 2 to FIG. 6 are schematic flow diagrams showing the conventional process for manufacturing reflective spatial light modulator mirror devices, wherein the cross-sectional views of FIG. 2 to FIG. 6 are obtained along cross-sectional line I—I shown in FIG. 1.

Referring to FIG. 2 to FIG. 6, FIG. 2 to FIG. 6 are schematic flow diagrams showing the conventional process for manufacturing reflective spatial light modulator mirror devices, wherein the cross-sectional views of FIG. 2 to FIG. 6 are obtained along cross-sectional line I—I shown in FIG. 1. A sacrificial layer 114 is first formed by using a deposition method to cover a substrate 100 which is transparent, and a mirror layer 104 is formed by using a sputtering method to cover the sacrificial layer 114, wherein the material of the sacrificial layer 114 is dielectric material and the material of the mirror layer 104 is metal. Then, a photolithography technique and an etching technique are used to define the mirror layer 104, thereby removing a portion of the mirror layer 104 to form openings 116 on the sacrificial layer 114 and expose a portion of the sacrificial layer 114, and meanwhile, a mirror pattern of the mirror device 102 is transferred onto the mirror layer 104, such as shown in FIG. 2.

Figure 3:
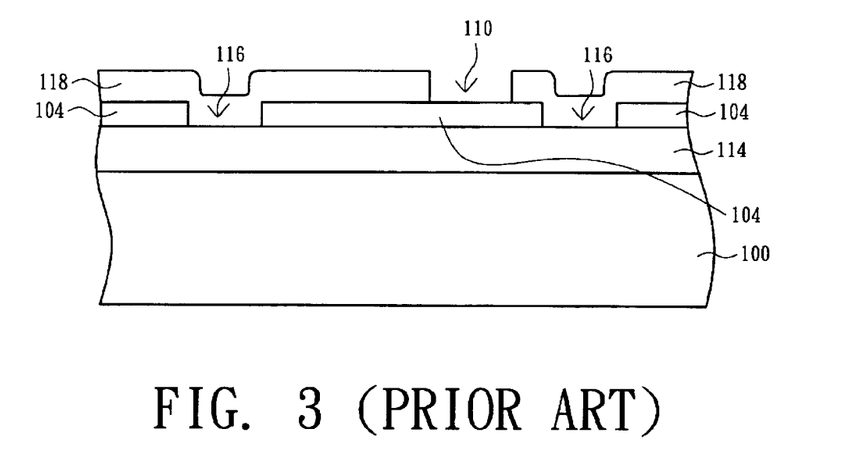

After the mirror pattern of the mirror device 102 is transferred onto the mirror layer 104, a sacrificial layer 118 is formed by using a deposition method to cover the mirror layer 104 and the sacrificial layer 114 exposed by the openings 116. Then, a definition step is performed by using a photolithography technique and an etching technique, and a portion of the sacrificial layer 118 is removed to expose a portion of the mirror layer 104, so as to form a contact opening 110 of the mirror layer 104 in the sacrificial layer 118 on the portion of the mirror layer 104, such as shown in FIG. 3.

Figure 4:
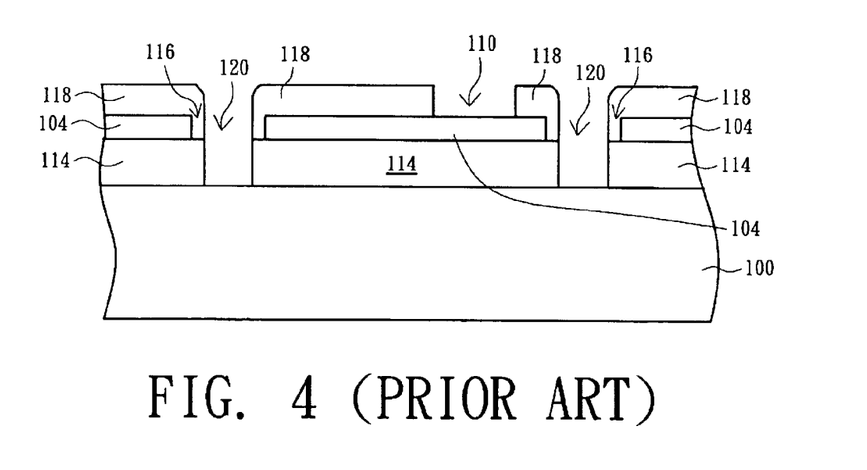

After the contact opening 110 of the mirror layer 104 is formed, a definition step is performed by using a photolithography method and an etching method similarly, and a portion of the sacrificial layer 118 located in the openings 116 is removed to expose a portion of the substrate 100, so as to form contact openings 120 of the substrate 100 in the opening 116, such as shown in FIG. 4. Besides, the contact openings 120 of the substrate 100 can be formed before the contact opening 110 of the mirror layer 104 is formed.

Figure 5:
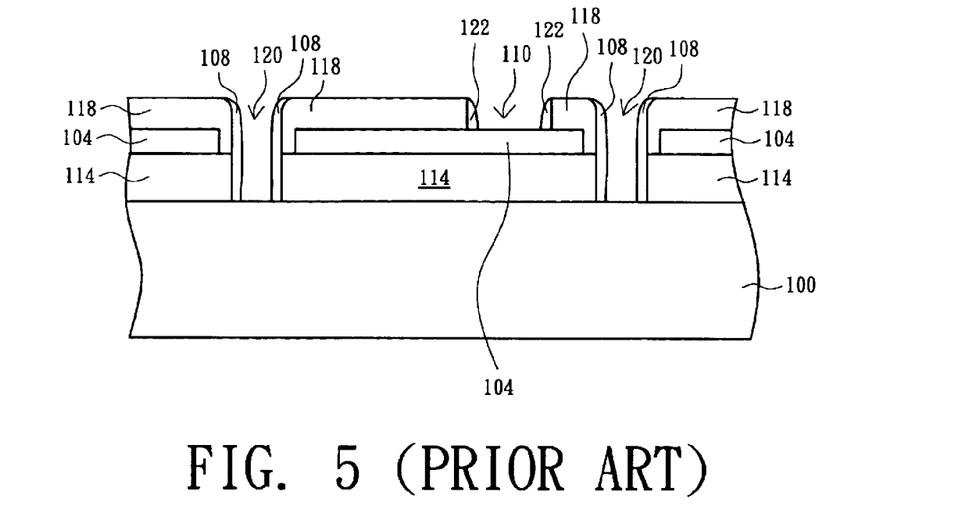

After the contact opening 110 of the mirror layer 104, and the contact openings 120 of the substrate 100 are formed, a support material layer (of which only a support layer 122 and the supporting posts 108 are shown) is formed by using a deposition method to cover the sacrificial layer 118; the mirror layer 104 exposed by the contact opening 110; and the substrate 100 and the sacrificial layer 114 exposed by the contact openings 120. Then, a portion of the support material layer is removed by using an etching back method until the surface of the sacrificial layer 118 is exposed. At this point, the remaining support material layer within the contact openings 120 forms the supporting posts 108, and the remaining support material layer within the contact opening 110 forms the support layer 122. The contact opening 110 is wider, so that after etching back step is performed, the bottom of the contact opening 110 is not entirely covered by the support layer 122 within the contact opening 110, and a portion of the mirror layer 104 is exposed, such as shown in FIG. 5.

Figure 6:
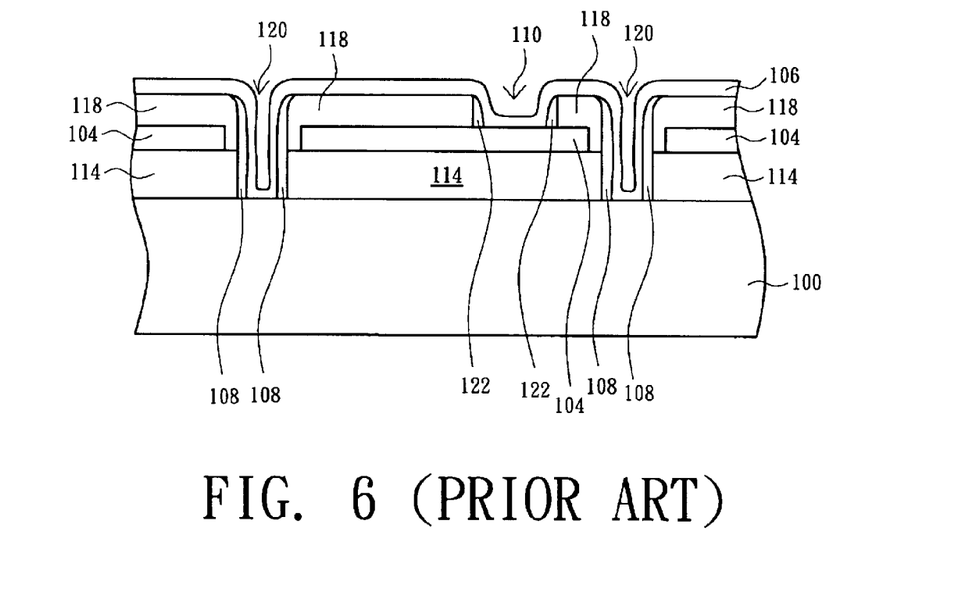
Figure 7:
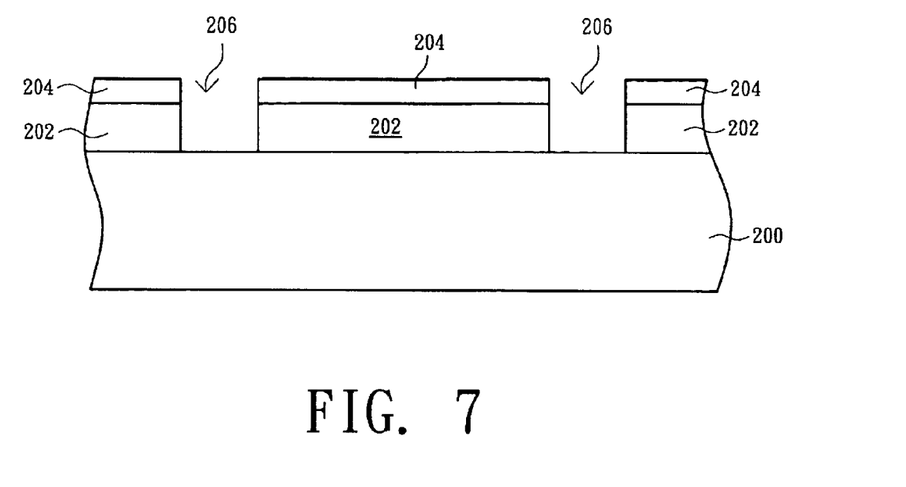
FIG. 7 to FIG. 12 are schematic flow diagrams showing the process for manufacturing reflective spatial light modulator mirror devices in accordance with a preferred embodiment of the present invention.

Then, a material film of the hinge layer 106 is formed by using a sputtering method to cover the sacrificial layer 118, the supporting posts 108, the support layer 122, and the mirror layer 104 exposed by the contact opening 110, wherein the material of the material film of the hinge layer 106 is a conductive material. A patterning definition step of the hinge layer 106 is performed by using a photolithography method and an etching method, so as to form the hinge layer 106 on a portion of the sacrificial layer 118; the support layer 122; the supporting posts 108; the contact openings 120; the mirror layer 104 exposed by the contact opening 110; and the contact opening 110, such as shown in FIG. 6. The supporting posts 108 in the contact openings 120 can be used to support the hinge layer 106, and the hinge layer 106 in the contact opening 110 is directly connected to the mirror layer 104. After the sacrificial layer 114 and the sacrificial layer 118 are removed, the hinge layer 106 is first supported by the supporting posts 108, and the mirror layer 104 is hanged via the direct connection of the hinge layer 106 and a portion of the mirror layer 104.

However, referring to FIG. 3 and FIG. 4., because a portion of the sacrificial layer 114 is stacked with the sacrificial layer 118, and the adhesion between the sacrificial layer 114 and the sacrificial layer 118 is poor, the sacrificial layer 114 and the sacrificial layer 118 peel off easily, and thus the process reliability is reduced. Next, referring to FIG. 3 and FIG. 4 again, during the aforementioned process for manufacturing the reflective spatial light modulator mirror devices, the sacrificial layer 118 and the sacrificial layer 114 need to be etched while the contact openings 120 of the substrate 100 are manufactured, and only the sacrificial layer 118 needs to be removed while the contact opening 110 of the mirror layer 104 is manufactured. Hence, the contact openings 120 of the substrate 100 and the contact opening 110 of the mirror layer 104 need to be manufactured respectively, and thus process steps are increased. Moreover, while the etching back step of the support material layer is performed, a portion of the support material layer in the contact openings 120 is removed, so that the structural strength of the supporting posts 108 formed in the contact openings 120 is reduced.

SUMMARY OF THE INVENTION

According to the aforementioned conventional method for manufacturing the reflective spatial light modulator mirror devices, the stacked portion of the second sacrificial layer and the first sacrificial layer peels off easily, thus decreasing the process reliability and yield. Besides, due to the second sacrificial layer stacked with the first sacrificial layer, the contact opening of the mirror layer and the contact openings of the substrate need to be defined respectively, thus increasing the number of process steps, and increasing process load and process cost.

Therefore, one object of the present invention is to provide a method for manufacturing reflective spatial light modulator mirror devices, by etching and removing a first sacrificial layer beneath a portion of a mirror layer while a pattern of the mirror layer is etched. Hence, the first sacrificial layer would not be stacked with a second sacrificial layer deposited subsequently, thereby preventing the first sacrificial layer and the second sacrificial layer from peeling off.

Another object of the present invention is to provide a method for manufacturing reflective spatial light modulator mirror devices. In the method, while a pattern of a mirror layer is defined, openings are formed in the mirror layer and a first sacrificial layer, and a substrate is exposed. Thus, after a second sacrificial layer is formed subsequently, the thickness of the sacrificial layer in the openings is approximate to that on the mirror layer, so that contact openings of the substrate located in the openings and a contact opening of the mirror layer located on the mirror layer are formed simultaneously, thereby decreasing the number of process steps; reducing process complexity; and lowering process cost.

Still another object of the present invention is to provide a method for manufacturing reflective spatial light modulator mirror devices. In the method, after a support material layer is conformally deposited on contact openings of a substrate, the contact openings of the substrate can be first filled with a photoresist material, and then an etching back step of the support material layer is performed. Therefore, the support material layer structure within the contact openings of the substrate used as supporting posts of the mirror layer can be maintained, so as to enhance the structural strength of the supporting posts of the mirror layer.

According to the aforementioned major object, the present invention further provides a method for manufacturing reflective spatial light modulator mirror devices, the method comprising: providing a transparent substrate, wherein a first sacrificial layer and a mirror layer are formed in sequence to stack on the transparent substrate, wherein the material of the first sacrificial layer can be such as amorphous silicon; removing a portion of the mirror layer and a portion of the first sacrificial layer to form a plurality of openings in the mirror layer and the first sacrificial layer and to expose a portion of the transparent substrate; forming a second sacrificial layer to cover the mirror layer, the first sacrificial layer exposed by the openings, and the transparent substrate exposed by the openings; removing a portion of the second sacrificial layer to form a substrate contact opening in each of the openings and to form a mirror layer contact opening on the mirror layer; forming a support material layer to conformally cover the second sacrificial layer, the openings, the substrate contact opening, the mirror layer contact opening, the substrate exposed by the substrate contact opening, and the mirror layer exposed by the mirror layer contact opening; forming a photoresist layer to fill a portion of each of the substrate contact opening and to cover the support material layer in the substrate contact opening; and performing an etching back step to remove a portion of the support material layer until exposing the second sacrificial layer.

After the etching back step of the support material layer is completed, the photoresist layer in the substrate contact opening is removed, and a hinge layer is formed to cover the second sacrificial layer, the support material layer, and the mirror layer, so as to complete the major process for manufacturing reflective spatial light modulator mirror devices.

Because a portion of the mirror layer and the first sacrificial layer beneath the portion of the mirror layer are removed simultaneously during the first definition step, the peeling, resulted from the first sacrificial layer and the second sacrificial layer stacked with each other, between the first sacrificial layer and the second sacrificial layer can be avoided, thereby enhancing process reliability and yield. Furthermore, the substrate contact opening and the mirror layer contact opening can be defined at the same time during the second definition step, so as to decrease the number of process steps and achieve the object of reducing process load. Besides, before the support material layer is etched back, the photoresist layer is filled in each of the substrate contact openings, so that the structural strength of the support material layer in each of the substrate contact openings can be prevented from being decreased due to etching, and supporting posts composed of stronger support material layer can be obtained.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses a method for manufacturing reflective spatial light modulator mirror devices, and with the application of the method, process step can be simplified, process cost can be reduced effectively, and the object of enhancing reliability and yield can be obtained. In order to make the illustration of the present invention more explicitly and completely, the following description and the drawings from FIG. 7 to FIG. 12 are stated.

Referring to FIG. 7 and FIG. 12, FIG. 7 to FIG. 12 are schematic flow diagrams showing the process for manufacturing reflective spatial light modulator mirror devices in accordance with a preferred embodiment of the present invention. Firstly, a substrate 200, which is transparent, is provided, wherein the material of the substrate 200 can be a transparent material, such as glass. Preferably, the thickness of the substrate 200 is between 600 $\mu$m and 700 $\mu$m. Next, a sacrificial layer 202 is formed by using such as a deposition method to cover the surface of the substrate 200, wherein the material of the sacrificial layer 202 can be such as amorphous silicon, and the thickness of sacrificial layer 202 is preferably between 5000 Å and 10000 Å. Then, a mirror layer 204 is formed by using such as a sputtering method to cover the sacrificial layer 202, wherein the mirror layer 204 is preferably composed of an $SiO_x$ layer/AlSiCu layer/$SiO_x$ layer compound structure. In the $SiO_x$ layer/AlSiCu layer/$SiO_x$ layer compound structure, the thickness of each of the $SiO_x$ layer is preferably between 100 Å and 500 Å, and the thickness of the AlSiCu layer is preferably between 1000 Å and 3000 Å. After the deposition step of the mirror layer 204 is completed, a definition step is performed by using such as a photolithography technique and an etching technique to remove a portion of the mirror layer 204 and a portion of the sacrificial layer 202, so as to form openings 206 in the mirror layer 204 and the sacrificial layer 202 to expose a portion of the substrate 200, such as the structure shown in FIG. 7.

Figure 8:
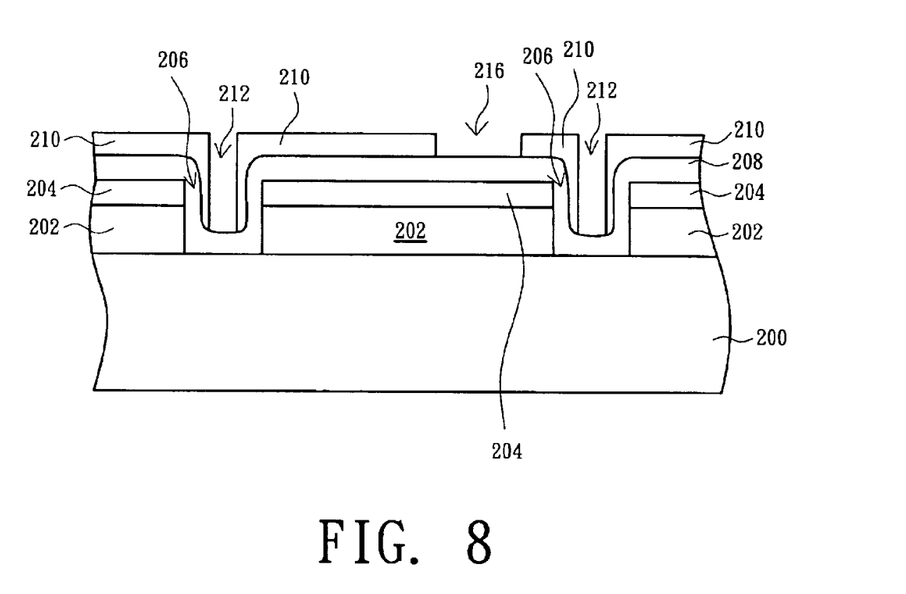

After the openings 206 are formed in the mirror layer 204 and the sacrificial layer 202, a sacrificial layer 208 is formed by using such as a conformal deposition method to cover the mirror layer 204, and the substrate 200 and the sacrificial layer 202 exposed by the openings 206, wherein the material of the sacrificial layer 208 can be such as amorphous silicon, and the thickness of the sacrificial layer 208 is preferably between 5000 Å and 10000 Å. After the sacrificial layer 208 is formed, a photoresist layer 210 is formed by using such as a photolithography method to cover a portion of the sacrificial layer 208. In the openings 206, the photoresist layer 210 comprises openings 212 having a substrate contact pattern, and on the mirror layer 204, the photoresist layer 210 comprises an opening 216 having mirror layer contact pattern, such as shown in FIG. 8.

Figure 9:
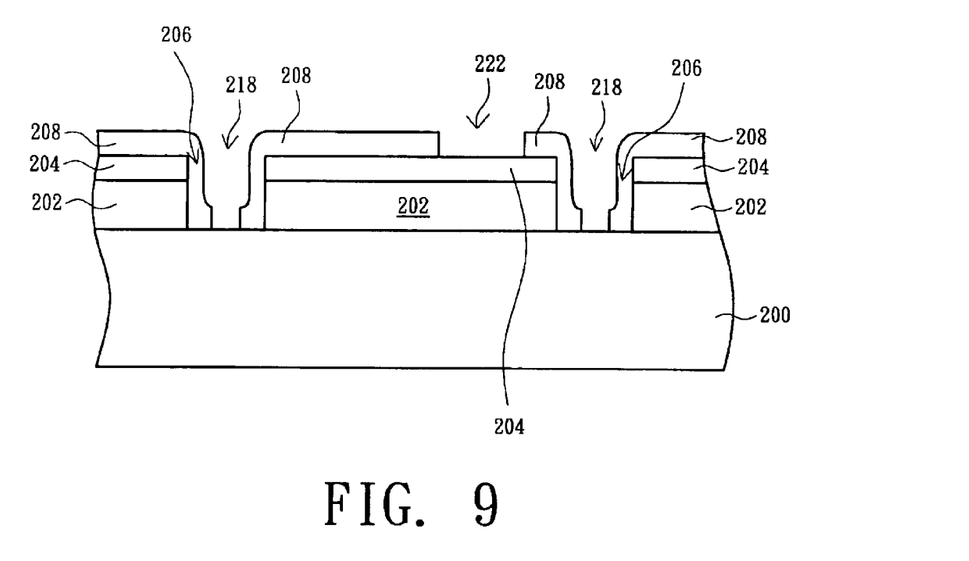

Then, the sacrificial layer 208 exposed by the openings 212 and the opening 216 are removed by using such as an etching method, so as to form contact openings 218 of the substrate 200 to expose the substrate 200 and a contact opening 222 of the mirror layer 204. Subsequently, the remaining photoresist layer 210 is removed by using such as a stripping method, and the sacrificial layer 208 is exposed, such as shown in FIG. 9.

One feature of the present invention is that while manufacturing the contact openings 218 of the substrate 200 and the contact opening 222 of the mirror layer 204, only the sacrificial layer 208 conformally deposited previously needs to be removed, and the difference of the thickness through the sacrificial layer 208 is very small. Therefore, only one definition step is needed to form the contact openings 218 of the substrate 200 and the contact opening 222 of the mirror layer 204 simultaneously, thereby decreasing the number of process step, reducing process load, and lower process cost.

Figure 10:
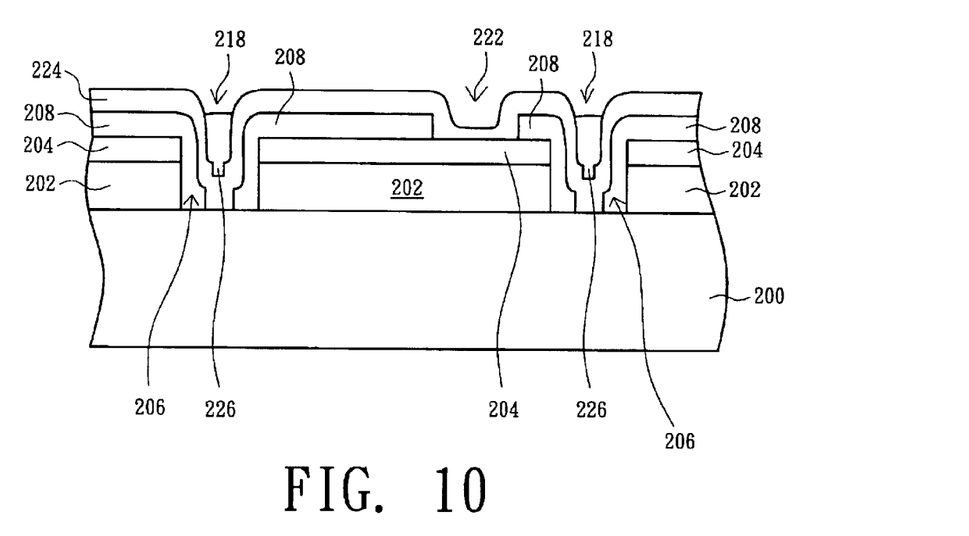
Figure 11:
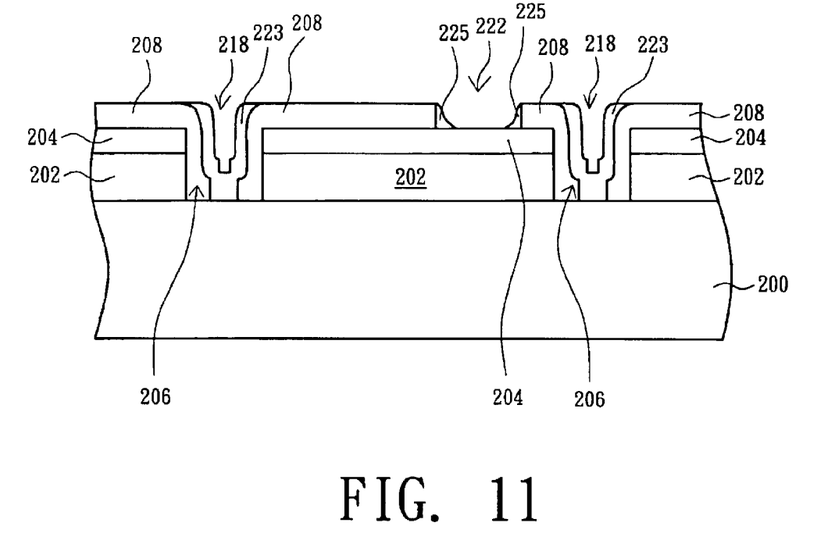

After the contact openings 218 and the contact opening 222 are completed, a support material layer 224 is formed by using such as a conformal deposition method to cover the sacrificial layer 208, the substrate 200 exposed by the contact openings 218, and the mirror layer 204 exposed by the contact opening 222. The material of the support material layer 224 is preferably a material with stronger structure, such as SiN, and the thickness of the support material layer 224 is preferably between 2000 Å and 4000 Å. At this point, an etching back step is performed on the support material layer 224 directly. Or, in order to decrease the etching degree of the support material layer 224 within the contact openings 218, a portion of the contact openings 218 can be first filled with a photoresist layer 226, such as shown in FIG. 10. Then, an etching back step is performed on the support material layer 224 to remove a portion of the support material layer 224 until exposing the sacrificial layer 208. After the etching back step of the support material layer 224 is performed, the remaining support material layer 224 is remained in the contact openings 218 and the sidewall of the contact opening 222, and a portion of the mirror layer 204 is exposed. The support material layer 224 remaining within the contact openings 218 form supporting posts 223, and the support material layer 224 remaining in the contact opening 222 form support layers 225, such as shown in FIG. 11.

Figure 12:
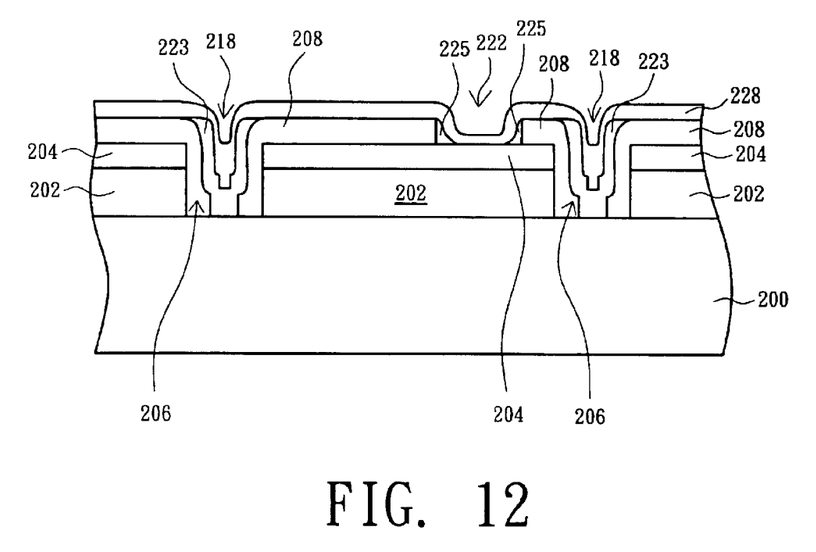

Subsequently, a material film of the hinge layer 228 is formed by using such as a deposition method to cover the supporting posts 223, the support layers 225, the sacrificial layer 208, and the mirror layer 204 exposed by the contact opening 222. The material film of the hinge layer 228 is preferably a Ti layer/$SiN_x$ layer/Ti layer compound structure, and the thickness of each of the Ti layer is preferably between 100 Å and 300 Å, and the thickness of the $SiN_x$ layer is preferably between 400 Å and 600 Å. Then, the material film of the hinge layer 228 is defined by using such as a photolithography method and an etching method, so as to form the hinge layer 228 on the supporting posts 223, the support layers 225, a portion of the sacrificial layer 208, and the mirror layer 204 exposed by the contact opening 222, such as shown in FIG. 12. At this point, all of the sacrificial layer 202 and the sacrificial layer 208 can be removed to complete the process of the reflective spatial light modulator mirror devices such as shown in FIG. 1.

The supporting posts 223 in the contact openings 218 can be used to support the hinge layer 228, and the hinge layer 228 in the contact opening 222 is connected with the mirror layer 204. After the sacrificial layer 202 and the sacrificial layer 208 are removed, the supporting posts 223 are used to support the hinge layer 228 firstly, and the mirror layer 204 is hanged via the connection of the hinge layer 228 and a portion of the mirror layer 204.

According to the aforementioned description, one advantage of the present invention is that while a pattern of a mirror layer is etched, a sacrificial layer beneath a portion of the mirror layer is etched and removed simultaneously. Therefore, the sacrificial layer would not be stacked with a sacrificial deposited subsequently, thereby preventing the sacrificial layers from peeling off, and achieving the object of enhancing process reliability and yield.

Another advantage of the present invention is, because openings are formed in the mirror layer and a first sacrificial layer while a pattern of a mirror layer is defined, a substrate is exposed. Thus, after a second sacrificial layer is formed subsequently, the second sacrificial layer only exists in the openings and on the mirror layer, and the thickness of the sacrificial layer in the openings is approximate to that on the mirror layer, so that contact openings of the substrate and contact openings of the mirror layer are formed simultaneously, thereby achieving the object of decreasing the number of process steps; reducing process complexity; and lowering process cost.

Still another advantage of the present invention is, because after a support material layer is conformally deposited on contact openings of a substrate, the contact openings of the substrate can be first filled with a photoresist material, and then an etching back step of the support material layer is performed, the etching degree of the support material layer within the contact openings of the substrate can be reduced, so as to achieve the object of effectively enhancing the structural strength of supporting posts of the mirror layer.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for manufacturing reflective spatial light modulator mirror devices, the method comprising:
   providing a substrate, wherein a first sacrificial layer and a mirror layer are formed in sequence to stack on the substrate;
   removing a portion of the mirror layer and a portion of the first sacrificial layer to form a plurality of openings in the mirror layer and the first sacrificial layer and to expose a portion of the substrate;
   forming a second sacrificial layer to cover the mirror layer, the first sacrificial layer, and the substrate;
   removing a portion of the second sacrificial layer to form a substrate contact opening in each of the openings and to at least form a mirror layer contact opening on the mirror layer;
   forming a support material layer to conformally cover the second sacrificial layer, the openings, the substrate contact opening, and the mirror layer contact opening; and
   performing an etching back step to remove a portion of the support material layer until exposing the second sacrificial layer.

2. The method for manufacturing the reflective spatial light modulator mirror devices according to claim 1, wherein the material of the substrate is a transparent material.

3. The method for manufacturing the reflective spatial light modulator mirror devices according to claim 1, wherein the material of the substrate is glass.

4. The method for manufacturing the reflective spatial light modulator mirror devices according to claim 1, wherein the material of the first sacrificial layer is amorphous silicon.

5. The method for manufacturing the reflective spatial light modulator mirror devices according to claim 1, wherein the mirror layer is an $SiO_x$ layer/AlSiCu layer/$SiO_x$ layer compound structure.

6. The method for manufacturing the reflective spatial light modulator mirror devices according to claim 1, wherein the material of the second sacrificial layer is amorphous silicon.

7. The method for manufacturing the reflective spatial light modulator mirror devices according to claim 1, wherein the material of the support material layer is SiN.

8. The method for manufacturing the reflective spatial light modulator mirror devices according to claim 1, between the step of forming the support material layer and the etching back step, further comprises forming a photoresist layer filling in a portion of the openings.

9. The method for manufacturing the reflective spatial light modulator mirror devices according to claim 1, after the etching back step, further comprises forming a hinge layer on the second sacrificial layer, the support material layer, and the mirror layer.

10. The method for manufacturing the reflective spatial light modulator mirror devices according to claim 9, wherein the hinge layer is a Ti layer/$SiN_x$ layer/Ti layer compound structure.

11. A method for manufacturing reflective spatial light modulator mirror devices, the method comprising:
   providing a substrate, wherein a first sacrificial layer and a mirror layer are formed in sequence to stack on the substrate;
   removing a portion of the mirror layer and a portion of the first sacrificial layer to form a plurality of openings in the mirror layer and the first sacrificial layer and to expose a portion of the substrate;
   forming a second sacrificial layer to cover the mirror layer, the first sacrificial layer, and the substrate;
   removing a portion of the second sacrificial layer to form a substrate contact opening in each of the openings and to at least form a mirror layer contact opening on the mirror layer;
   forming a support material layer to conformally cover the second sacrificial layer, the openings, the substrate contact opening, and the mirror layer contact opening;
   forming a photoresist layer to fill a portion of the openings; and
   performing an etching back step to remove a portion of the support material layer until exposing the second sacrificial layer.

12. The method for manufacturing the reflective spatial light modulator mirror devices according to claim 11, wherein the material of the substrate is a transparent material.

13. The method for manufacturing the reflective spatial light modulator mirror devices according to claim 11, wherein the material of the substrate is glass.

14. The method for manufacturing the reflective spatial light modulator mirror devices according to claim 11, wherein the material of the first sacrificial layer is amorphous silicon.

15. The method for manufacturing the reflective spatial light modulator mirror devices according to claim 11, wherein the mirror layer is an $SiO_x$ layer/AlSiCu layer/$SiO_x$ layer compound structure.

16. The method for manufacturing the reflective spatial light modulator mirror devices according to claim 11, wherein the material of the second sacrificial layer is amorphous silicon.

17. The method for manufacturing the reflective spatial light modulator mirror devices according to claim 11, wherein the material of the support material layer is SiN.

18. The method for manufacturing the reflective spatial light modulator mirror devices according to claim 11, after the etching back step, further comprises forming a hinge layer on the second sacrificial layer, the support material layer, and the mirror layer.

19. The method for manufacturing the reflective spatial light modulator mirror devices according to claim 18, wherein the hinge layer is a Ti layer/SiN, layer/Ti layer compound structure.

20. A method for manufacturing reflective spatial light modulator mirror devices, the method comprising:
   providing a substrate, wherein a first sacrificial layer and a mirror layer are formed in sequence to stack on the substrate;
   removing a portion of the mirror layer and a portion of the first sacrificial layer to form a plurality of openings in the mirror layer and the first sacrificial layer and to expose a portion of the substrate;
   forming a second sacrificial layer to cover the mirror layer, the first sacrificial layer, and the substrate;
   removing a portion of the second sacrificial layer to form a substrate contact opening in each of the openings and to at least form a mirror layer contact opening on the mirror layer; and
   providing a support layer in the substrate contact opening in each of the openings and a portion of the mirror layer contact opening.

21. The method for manufacturing the reflective spatial light modulator mirror devices according to claim 20, wherein the material of the substrate is a transparent material.

22. The method for manufacturing the reflective spatial light modulator mirror devices according to claim 20, wherein the material of the substrate is glass.

23. The method for manufacturing the reflective spatial light modulator mirror devices according to claim 20, wherein the material of the first sacrificial layer is amorphous silicon.

24. The method for manufacturing the reflective spatial light modulator mirror devices according to claim 20, wherein the mirror layer is an $SiO_x$ layer/AlSiCu layer/$SiO_x$ layer compound structure.

25. The method for manufacturing the reflective spatial light modulator mirror devices according to claim 20, wherein the material of the second sacrificial layer is amorphous silicon.

26. The method for manufacturing the reflective spatial light modulator mirror devices according to claim 20, wherein the material of the support layer is SiN.

27. The method for manufacturing the reflective spatial light modulator mirror devices according to claim 20, after the step of proving the support layer, further comprises forming a hinge layer on the second sacrificial layer, the support layer, and the mirror layer.

28. The method for manufacturing the reflective spatial light modulator mirror devices according to claim 27, wherein the hinge layer is a Ti layer/$SiN_x$ layer/Ti layer compound structure.

* * * * *